United States Patent [19]

Weibler et al.

[11] Patent Number: 4,841,938
[45] Date of Patent: Jun. 27, 1989

[54] DEVICE FOR DETERMINING THE DIRECTION OF FLOW

[75] Inventors: Wolfgang Weibler, Hofheim a. T.; Wolfgang Porth, Frankfurt am Main, both of Fed. Rep. of Germany

[73] Assignee: Vdo Adolf Schindling AG, Frankfurt am Main, Fed. Rep. of Germany

[21] Appl. No.: 98,405

[22] Filed: Sep. 17, 1987

[30] Foreign Application Priority Data

Nov. 4, 1986 [DE] Fed. Rep. of Germany ....... 3637540

[51] Int. Cl.⁴ .................... G01P 13/04; F02D 41/18; F02D 41/30
[52] U.S. Cl. .................... 123/494; 73/118.2; 73/204.21
[58] Field of Search ........... 123/494; 73/118.2, 204.21

[56] References Cited

U.S. PATENT DOCUMENTS

| 3,147,618 | 9/1964 | Benson | 73/204 |
| 3,677,085 | 7/1972 | Hoyakawa | 73/204 |
| 3,777,563 | 12/1973 | Yamasaki et al. | 73/204 X |
| 3,975,951 | 8/1976 | Kohama et al. | 123/494 X |
| 4,083,244 | 4/1978 | Agar et al. | 73/204 |
| 4,304,129 | 12/1981 | Kawai et al. | 73/118.2 X |

FOREIGN PATENT DOCUMENTS

| 26822 | 2/1986 | Japan | 73/204 |
| 581400 | 11/1977 | U.S.S.R. | 73/204 |

Primary Examiner—Tony M. Argenbright
Attorney, Agent, or Firm—Martin A. Farber

[57] ABSTRACT

In order to recognize the occurrence of reverse flow in a rapidly pulsation stream of fluid flowing with constant mass flow in particular within the intake duct (10) of an internal combustion engine, there is proposed a device for determining the direction of flow having a turbulence-sensitive sensor element (12) which is arranged between a flow straightener (32) and an eddy element (16), the sensor element (12) being exposed to laminar or else to turbulent flow depending on the direction of flow.

26 Claims, 1 Drawing Sheet

DEVICE FOR DETERMINING THE DIRECTION OF FLOW

FIELD AND BACKGROUND OF THE INVENTION

The present invention relates to a device for determining the direction of flow of a fluid of substantially directed flow, with known mass flow, having a flow straightener and a sensor element associated therewith which gives off electric signals.

The fuel injection of internal combustion engines is controlled as a function of the mass flow of the intake air. For the measurement of the mass flow, use is made in many cases of a mass-flow measuring device which operates in accordance with the eletrothermal principle. Such a measuring device is provided, for compensation of the temperature, with at least one temperature-measuring element and the mass-flow measuring device proper, the main component of which is an electrically heatable resistance element which is arranged in the mass flow. The heat removed from this heating element is a measure of the mass flow, more heat being removed the stronger the mass flow is.

Such a mass-flow measuring device is very insensitive to the direction of the flow since, regardless of whether the flow is directed forward or backward, practically the same electric signal is given off, corresponding to the heat removed. In other words, with a known mass-flow measuring device one can merely determine the amount of the mass flow, but not its direction. It has now been found that in the intake system of internal combustion engines oscillations of the air column occur under certain operating conditions, they being superimposed on the constant flow so that a rapidly pulsating flow results therefrom. Depending on the rpm and the number of cylinders, the natural frequency of the oscillation is within the range of between 10 and 1000 Hz. Depending on the velocity of flow and the amplitude of oscillation, reverse flows occur for short periods of time. As a result of the principle of measurement of the mass-flow measuring device described above, reverse flows produce the same measurement signal as intake flows, so that in the final analysis too large an amount of fuel is fed to the engine.

Direction-sensitive flowmeters are known which have two resistance elements which are arranged on a common support and are installed one behind the other in the direction of flow. Such flowmeters, however, are not suitable, in view of their inertia, for the detecting of rapid changes in flow.

SUMMARY OF THE INVENTION

It is an object of the present invention to create a rapidly responding device, which can be arranged within the intake system of an internal combustion engine, for determining the direction of flow of a pulsating air stream during the time of one pulsation.

According to the invention, this object is achieved in the manner that sensor element (12) is sensitive to turbulence and is arranged in the path of flow between the flow straightener (32) and an eddy element (16).

In this way the result is obtained that the sensor element is exposed to a strongly turbulent flow when the fluid flows in the direction from the eddy element to the sensor element. In the reverse direction of flow, the sensor element is located within the undisturbed laminar flow of the fluid. The sensor element gives off different electric signals depending upon whether it is exposed to laminar or turbulent flow.

In the preferred embodiment, the sensor element (12) is an electrically heated temperature-dependent resistance element (112). This resistance element is cooled by the fluid which flows past it, the intensity and uniformity of the cooling being dependent on the state of flow of the fluid. While in the case of laminar flow completely constant cooling takes place, with turbulent flow there is a substantially more intense cooling action which varies with the frequency of the turbulences. Accordingly, with turbulent flow, high-frequency changes in resistance take place which are impressed as high-frequency modulation on the current conducted through the resistance element. It is therefore obvious that for such a measurement the resistance element must have extremely low thermal inertia in order not by itself to balance out the rapid variations.

For the detection for measurement of the variations in current and/or voltage, the temperature-dependent resistance element can be arranged in a branch of a bridge circuit formed with three other fixed resistors, the bridge voltage experiencing a modulation which corresponds to the changes in resistance.

In order to obtain a high signal level it is advantageous for the resistance element to consist of a metallic conductor such as nickel or platinum and therefore a metal of high positive temperature coefficient (PTC).

In special cases, it may also be desirable for the resistance element (112) to have a negative temperature coefficient (NTC).

A rapid response of the resistance elements (112) is assured when they are developed in the form of wires. In such case the resistance element is arranged freestanding in the flow and the mass inertia, and thus the response time, of the resistance element can be controlled via the cross section of the wire. By "wire" there is to be understood here any elongated development of the resistor, whether its cross section is round, polygonal or flat. Particularly in the case of thin wires, which permit of rapid response, the mechanical strength must be taken into account.

Therefore, it has proven advisable to develop resistance elements (112) in sheet shape, the resistance layer being applied onto a substrate of slight thermal capacitance and high temperature conductance.

Such resistance elements can, in particular, be integrated into miniaturized components. The miniaturized embodiment has the advantage that the turbulent flow is detected at a point. The small three-dimensional size of the resistance element furthermore has the advantage that there is no mean-value formation, in view of the small thermal capacitance.

A reproducible measurement signal is obtained if a regulating unit (50) is provided for adjusting the feed voltage of the bridge circuit for the setting of the measurement temperature of the temperature-dependent resistance element (112). In this way measurement is effected, both in the case of small mass flow and in the case of high mass flow, with the same temperature of the measurement resistor. For the setting of the feed voltage a signal of the mass-flow measuring device can, for example, be processed. However, it is also possible so to regulate the feed voltage as a function of the mean resistance of the temperature-dependent resistance element that said value remains constant. Thus the measurement signal has a constant basic level on which the flow-affected modulation is impressed. For cleaning, the resistance element is heated for a short time at an elevated feed voltage.

As a further development of the invention it is proposed that the device of the invention be connected to a known device for controlling the fuel injection for an internal combustion engine as a function of the mass flow of the quantity of air drawn in, the fuel metering being effected as a function of the signals of the sensor element (12) which are given off upon turbulent flow. In this way it is possible to reduce the excessively high feeding of fuel which takes place under given operating conditions, as soon as a reverse flow is noted in the intake system of the internal combustion engine by the device of the invention.

One particularly advantageous embodiment of the apparatus of the invention is present is present if the sensor element (12) is connected to the input of an amplifier (52) whose output is connected, via a Schmitt trigger (54), to the input (60) of a control unit (64) which, via a second input (62), is furthermore connected to a mass-flow measuring device (66) and is connected on the output side to a fuel metering device (70). In this connection the measurement signal given off by a known mass-flow measuring device to a fuel metering device, also known per se, is acted on in accordance with the invention by the correction signal given off by the device for determining the direction of flow.

It has furthermore been found advisable to smooth the output signal of the control unit (64), which is subject to pulsation, by means of an integrator (68) before its entrance into the fuel metering device (66).

Since recognition of the turbulent flow takes place exclusively on basis of the high-frequency portion of the signal, it is advantageous to provide a band filter (51), developed as high-pass filter, between the amplifier (52) and the Schmitt trigger (54). It has also proven advisable to provide a narrow-band amplifier which combines the function of a broad-band amplifier and a following band filter. In each case it is advisable to arrange an integrator for mean-value formation in front of the input of the Schmitt trigger.

The noise signal which occurs in the periods of reverse flow as a result of the turbulence produced by the disturbing body is dependent in amplitude on the mass flow. In the case of constant input level of the Schmitt trigger, this leads to errors in the detection of the time interval of the reverse flow. It has therefore been found advantageous to vary the input level as a function of the mass flow. It is advisable, in addition, to vary the input level as a function of the speed of rotation of the engine and the throttle-value angle.

Further it is advantageous for the Schmitt trigger (54) to be connected to the mass-flow measuring device (66) for the adjustment of the level.

Also by a feature of the invention, the Schmitt trigger (54) is connected for the adjustment of the level to a speed-of-rotation measuring device and/or a device for detecting the angle of opening of the throttle valve of an internal combustion engine.

If the mass-flow measuring device and the device for determining the direction of flow are spaced apart from each other, it may happen that the signals of the two devices arrive shifted in time from each other. It is then advisable to arrange a phase shifter (56) between the output of the Schmitt trigger (54) and the input (60) of the control unit (64). If, in special cases, a period of time for influencing the measurement signal which is different from the duration of the correction signal is desired, then it is advantageous to arrange a monostable flip-flop (58) in front of the input of the control unit. In this way, a short incoming pulse can be correspondingly lengthened or else shortened.

The correction signal can act fundamentally in different ways on the measurement signal. In this connection it has been found advisable for a correction signal to be given off only when reverse flow takes place, i.e. for no signal to be given off to the control unit upon flow in the intake direction. The correction signal can, in principle, act in three particularly advantageous ways on the measurement signal:

1. The control unit (64) can supress the measurement signal coming from the mass-flow measuring device (66) as long as a correction signal is present on the second input (60) of the control unit. In this simple way, the unnecessary and injurious over-feeding of the fuel can be avoided. It is self-evident that, specifically with such a device, an integrator which smooths the output signal is of particular importance.

2. The control unit (64) can substract the value of a measurement signal found during the duration of a correction signal present at the input (60) from that value of the measurement signal which is found within the period of time of the absent correction signal. This theoretically correct influencing presupposes that both the mass flow and the direction of flow are determined completely without inertia and under identical measurement conditions. This result can be reached in practice only at great expense. Thus the mass-flow measuring device also has a certain integrating character since the air heated by the measurement element upon reverse flow passes again over the measurement element upon change to the normal direction of flow and thus cools it less. Accordingly, the following described control has proven economically the most logical.

3. The control unit (64) can reduce the value of the measurement signal found during the duration of a correction signal present on the input (60) to a predetermined fraction. By the pre-determining of the fraction and its variation as a function of the mass flow and/or the speed of rotation of the engine, an optimal adaptation to the different operating conditions and the technical circumstances of the measurement devices is possible.

BRIEF DESCRIPTION OF THE DRAWINGS

With the above and other objects and advantages in view, the present invention will become more clearly understood in connection with the detailed description of a preferred embodiment, when considered with the accompanying drawing, of which.

DETAILED DESCRIPTION OF THE PREFERRED EMBODIMENTS

Figure 1:
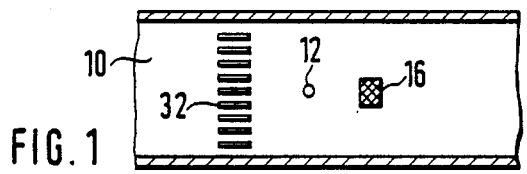
FIG. 1 is a diagrammatic view of the arrangement of one embodiment of the device of the invention.

FIG. 1 shows diagrammatically the geometrical arrangement of a sensor element 12 between a flow straightener 32 and an eddy element 16 within a flow channel 10. The sensor element 12 is shown diagrammatically as a temperature-dependent wire-shaped resistor seen in top view, it passing through the center of the mass flow flowing within the flow channel 10. On the one side of the sensor element there is a flow straightener 32 which, as a honeycomb body, has numerous parallel flow channels. On the other side of the sensor element there is an eddy element 16 in the form of a flat body which extends in longitudinal direction parallel to the sensor element. If the flow takes place, for instance, from left to right in the arrangement shown in FIG. 1, then the flow first comes against the flow straightener 32, then against the sensor element 12, and finally against the eddy element 16. In this way assurance is had that the sensor element is always acted on by laminar flow. In the reverse direction of flow, and therefrom from right to left, the sensor element 12 lies in the eddy zone of the flow which is caused by the eddy element 16, the flow then passing through the flow straightener 32. The sensor element 12, which is developed as an electrically heated temperature-dependent resistance element 112, is not as uniformly cooled in the turbulent flow as in the laminar flow. The electrical resistance of the resistance element thus changes correspondingly to the eddy frequency.

Figure 2:
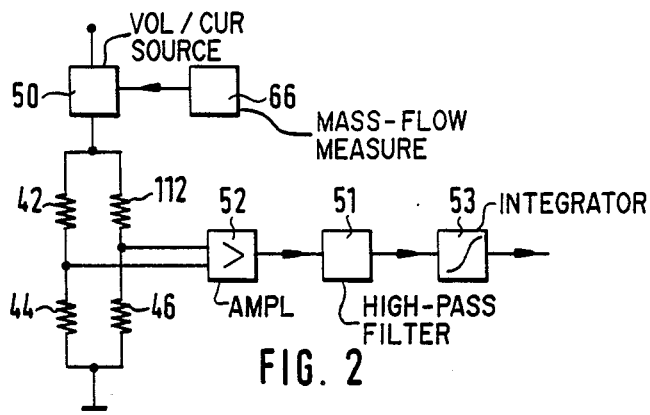
FIG. 2 is a diagrammatic wiring diagram of a bridge circuit of the device of the invention with temperature-dependent resistors.

In FIG. 2, the temperature-dependent resistance element arranged in the flow channel 10 is designated 112 and the fixed resistors of a bridge circuit are designated 42, 44 and 46, the resistors 112 and 46 as well as 42 and 44 being connected in each case as voltage dividers. The feeding of the bridge circuit is effected via a variable voltage/current source 50. Corresponding to the temperature-dependent change in resistance of the resistor 112, a voltage difference occurs in the bridge diagonals at the measurement points between the resistors 42 and 44 and between the resistors 112 and 46. From this voltage difference there is formed, via an amplifier 52, a correction signal which, after passing through a high-pass filter 51, is fed to an integrator 53 for formation of the mean value. The high-pass filter 51 is tuned to the turbulence frequency so that it permits passage only of those portions of the signal caused by the latter. The feed voltage for the bridge circuit which is given off by the voltage source 50 is controlled as a function of the measurement signal of a mass-flow measuring device 66. In this way, the result is obtained that stronger heating of the resistance element 112 takes place with high mass flow than with small mass flow or, in other words, overheating of the resistance element 112 is prevented in the case of low mass. The regulating of the temperature is effected in such a manner that the resistance element 112 takes on a constant positive difference in temperature as compared with the oncoming fluid.

Figure 3:
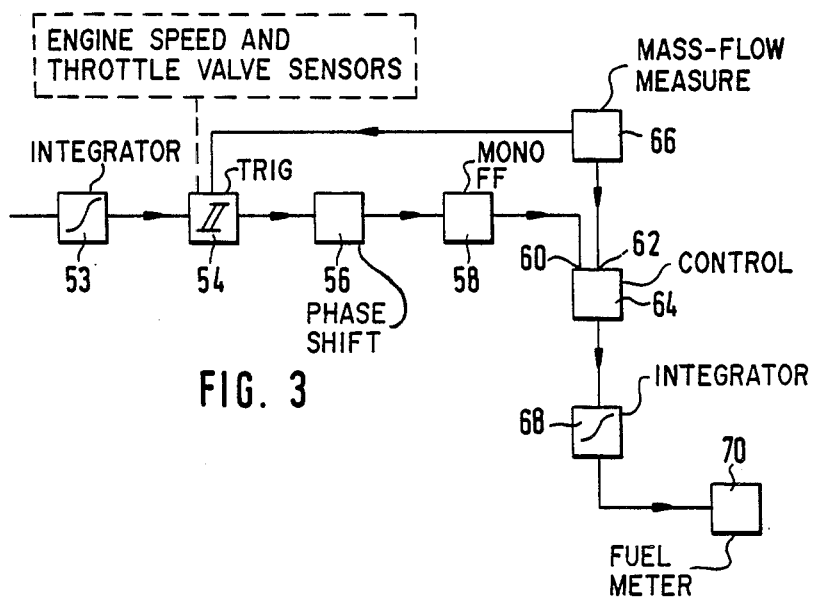
FIG. 3 is a diagrammatic view of the circuit arrangement for the control of the fuel metering device as a further development of the device of the invention.

FIG. 3 shows diagrammatically the further path of the correction signal given off by the amplifier 52 via the high-pass filter 51 and the integrator 53. A Schmitt trigger 54 which serves as threshold switch, on the one hand, screens out signals which are too low, and on the other hand, forwards a constant signal regardless of the value of the input signal. The output of the Schmitt trigger 54 is connected to an input 60 of a control unit 64. The measurement signal of the mass-flow measuring device 66 is received at another input 62 of the control unit 64. The output of the control unit 64 is connected to a fuel metering device 70. The pulsations of the mass flow which lead to pulsating signals are smoothed by means of an integrator 68.

With high velocity of the intake flow through the flow straightener, residual turbulences are not definitely eliminated, so that erroneous correction signals could be given off. It is similarly disturbing that the intensity of the turbulences produced by the disturbance member, and thus the amplitude of the noise signal, is dependent on the mass flow. In order reliably to prevent this, the Schmitt trigger 54 is connected to the mass-flow measuring device 66 in order to control the input level of the Schmitt trigger. With high mass flow, the input level of the Schmitt trigger is now raised to such an extent that turbulence signals below a certain threshold value are ignored.

Since mass-flow measuring device 66 and the resistance elements 12 and 14 serving for the recognition of direction are arranged at different places in the intake system, a phase shifter 56 is provided which sees to the synchronizing of the signals. For the correction of the pulse length of the measurement signals there is also provided a monostable flip-flop 58 which makes it possible to control the pulse duration of the correction signal differently from the pulse length of the input signal.

The control unit 64 has the task of adapting the signal given off to the fuel metering device, which signal is dependent primarily on the mass-flow measuring device, in accordance with the correction signal. Corresponding to the correction signal which occurs only upon reverse flow, the measurement signal of the mass-flow measuring device which enters during this phase of the pulsation is suppressed by the control unit or subtracted from the value of the measurement signal entering during the rest of the phase or reduces the measurement signal to a fraction lying between the measured value and zero, the value of the fraction as well as of the speed of rotation of the engine being also dependent on the value of the mass flow.

We claim:

1. In a device for determining direction of flow of a fluid of substantially undirectional flow, with known mass flow, the device having a flow straightener and a sensor element associated therewith for emitting electric signals; and wherein said device further comprises:
    an eddy element located in a path of flow of the fluid; and wherein
    said sensor element is sensitive to turbulence and is located in a path of flow of the fluid between the flow straightener and said eddy element, there being only one sensor element in said device, said one sensor element being located between the eddy element and the flow straightener.

2. The device as set forth in claim 1, wherein
    the sensor element is an electrically heated temperature-dependent resistance element.

3. The device as set forth in claim 2, wherein
    said resistance element has a positive temperature coefficient.

4. The device as set forth in claim 2, wherein
    said resistance element has a negative temperature coefficient.

5. The device as set forth in claim 3, wherein
    said resistance element is formed of wires.

6. The device as set forth in claim 4, wherein
    said resistance element is formed of wires.

7. The device as set forth in claim 3, wherein
    said resistance element has a sheet shape.

8. The device as set forth in claim 4, wherein
    said resistance element has a sheet shape.

9. The device as set forth in claim 2, further comprising a regulating unit coupled to said resistance element for adjusting the feed voltage of the resistance element.

10. The device as set forth in claim 1, further comprising
fuel metering means responsive to current flow in said sensor element for controlling the fuel injection for an internal combustion engine as a function of the mass flow of the quantity of air drawn in, fuel metering being effected as a function of the signals of the sensor element which are emitted upon turbulent flow induced by said eddy element.

11. In a device for determining direction of flow of a fluid of substantially unidirectional flow, with known mass flow, the device having a flow straightener and a sensor element associated therewith for emitting electric signals; and wherein said device further comprises:
an eddy element located in a path of flow of the fluid;
said sensor element is sensitive to turbulence and is located in a path of flow of the fluid between the flow straightener and said eddy element;
fuel metering means responsive to current flow in said sensor element for controlling the fuel injection for an internal combustion engine as a function of the mass flow of the quantity of air drawn in, fuel metering being effected as a function of the signals of the sensor element which are emitted upon turbulent flow induced by said eddy element;
a control unit;
a Schmitt trigger circuit for driving the control unit;
an amplifier connected to said sensor element for driving said Schmitt trigger circuit; and
means for measuring mass flow of the fluid, said measuring means driving said control unit; and wherein
said control unit is connected on its output side to said fuel metering device.

12. The device as set forth in claim 11, further comprising
an integrator connected between the output of said control unit and the input of said fuel metering means.

13. The device as set forth in claim 12, wherein
a high-pass filter and a further integrator are serially connected between said amplifier and said Schmitt trigger circuit.

14. The device as set forth in claim 13, wherein
said Schmitt trigger circuit is connected to the mass-flow measuring means for the adjustment of an input level to the Schmitt trigger circuit.

15. The device as set forth in claim 13, wherein
a trigger level of the Schmitt trigger circuit is adjustable in response to at least one of a speed-of-rotation measuring unit and a unit for detecting an angle of opening of a throttle valve of an internal combustion engine.

16. The device as set forth in claim 14, wherein
a trigger level of the Schmitt trigger circuit is adjustable in response to at least one of a speed-of-rotation measuring unit and a unit for detecting an angle of opening of a throttle valve of an internal combustion engine.

17. The device as set forth in claim 13, further comprising
a phase shifter connected between the output of the Schmitt trigger circuit and the input of the control unit.

18. The device as set forth in claim 13, further comprising
a monostable flip-flop connected between the output of the Schmitt trigger circuit and the input of the control unit.

19. The device as set forth in claim 11, wherein
said control unit suppresses a measurement signal coming from the mass-flow measuring means as long as a correction signal is applied from the Schmitt trigger circuit to said control unit.

20. The device as set forth in claim 11, wherein
said control unit substracts the value of a measurement signal of said flow measuring means found during the duration of a correction signal, applied to said control unit, from a value of the measurement signal which is obtained during an absence of a correction signal.

21. The device as set forth in claim 11, wherein
said control unit reduces the value of the measurement signal found during the duration of a correction signal, applied to said control unit, to a predetermined fraction of the value of the measurement signal.

22. A device for determining direction of flow of a fluid of substantially unidirectional flow, comprising
a flow straightener disposed in a path of flow of the fluid to produce laminar flow;
an eddy element located in said path downstream of said straightener;
a sensor element located in said path between said flow straightener and said eddy element, said eddy element producing eddies in the fluid flow at the sensor element upon a reverse flow of the fluid;
electric circuit means for energizing said sensor element to produce an electric signal responsive to a speed of flow of the fluid, the eddies inducing in the signal a high frequency component which is higher than a frequency component induced by laminar flow of the fluid; and
a filter connected to the circuit means for extracting the high frequency component from the signal of the sensor, the presence of the high frequency component indicating a reverse flow of the fluid.

23. A device according to claim 22, wherein the device further comprises
mass-flow measuring means for measuring mass flow of the fluid along the path, said measuring means outputting a speed signal indicating the mass flow of the fluid, said filter outputting a reversal signal indicating a reverse direction of fluid flow; and
control means coupled to said measuring means and to said filter for altering said speed signal in response to said reversal signal.

24. A device according to claim 23, wherein said fluid is intake air for an engine, said device further comprising
means for metering fuel to the engine, said metering means being coupled operatively via said control means to said measuring means for metering fuel in correspondence with a flow of the intake air.

25. A device according to claim 24, wherein
said control means suppresses the speed signal in response to the reversal signal.

26. A device according to claim 24, wherein
said control means reduces the speed signal in response to the reversal signal.

* * * * *